Oct. 9, 1962    F. A. GUERTH    3,057,953
TARGET TRACKING SYSTEM
Filed June 24, 1960    3 Sheets-Sheet 1

INVENTOR.
FRITZ A. GUERTH
BY
AGENT
ATTORNEY

Oct. 9, 1962 F. A. GUERTH 3,057,953
TARGET TRACKING SYSTEM
Filed June 24, 1960 3 Sheets-Sheet 3
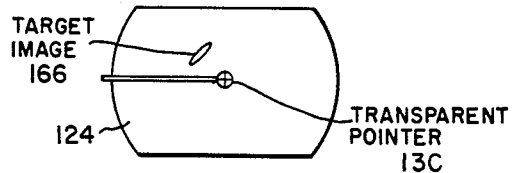
Fig. 4
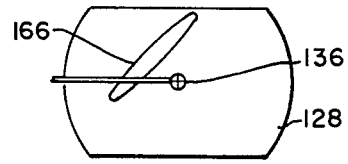
Fig. 5
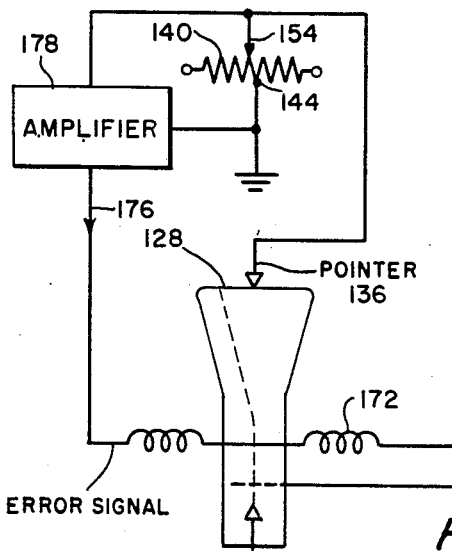
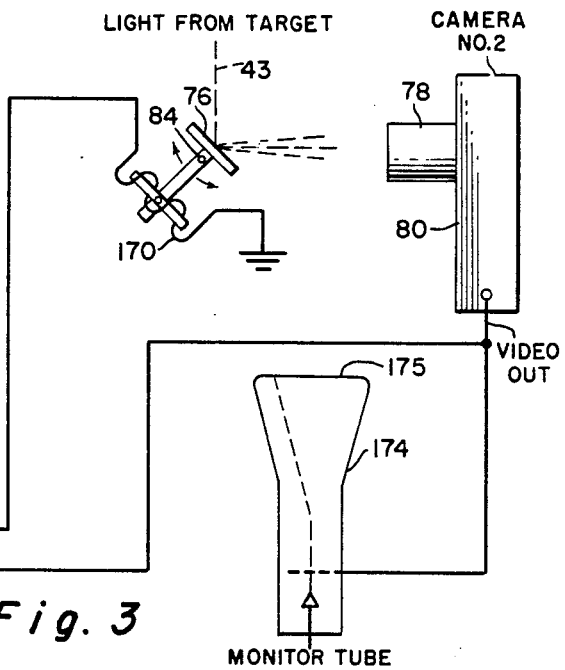
Fig. 3
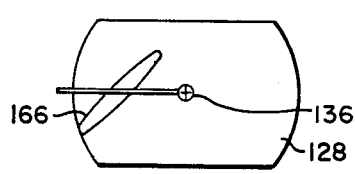
Fig. 6
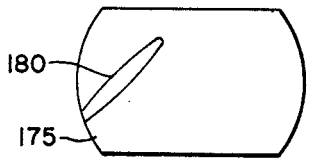
Fig. 8
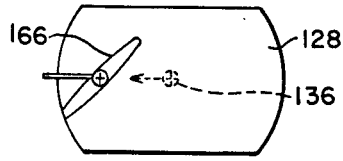
Fig. 7
Fig. 9
INVENTOR.
FRITZ A. GUERTH

United States Patent Office 3,057,953
Patented Oct. 9, 1962

3,057,953
TARGET TRACKING SYSTEM
Fritz A. Guerth, Camarillo, Calif., assignor to the United States of America as represented by the Secretary of the Navy
Filed June 24, 1960, Ser. No. 38,677
9 Claims. (Cl. 178—6.8)
(Granted under Title 35, U.S. Code (1952), sec. 266)

The invention described herein may be manufactured and used by or for the Government of the United States of America for governmental purposes without the payment of any royalties thereon or therefor.

The present invention relates to tracking devices, and more particularly to an electro-optical system which permits rapidly-moving objects such as missiles to be located by an observer and then their course followed so that information concerning their operation may be obtained for subsequent evaluation and/or analysis. In a preferred embodiment, the present concept is directed to a control system which enables a moving target to be optically tracked by using a television camera to develop an image of the target on the fluorescent screen of a cathode-ray monitor tube, this screen having associated therewith a pointer which is adapted for manipulation by the tracking operator so that it may be brought into positional coincidence with the image of the object being tracked regardless of where the latter may move within the screen area when the orientation of the camera changese relative to the tracked object.

It has been the practice to follow the flight of moving targets by orienting a television camera toward the target (such, for example, as a missile or rocket) and then controlling the movement of the television camera so that it is caused to follow the target's flight path. In a great majority of the tracking arrangements which have heretofore been devised, great demands are placed upon the ability of the tracker to manually follow the course of the missile regardless of changes or variations in its speed and/or trajectory. For example, when the object being tracked is at a considerable distance from the camera, very slight changes in the direction in which the camera is pointed produce quite large movements of the synthesized image. It requires considerable training and ability on the part of an operator to be able to follow these positional variations without either "overshooting" the anticipated position of the image, or to resolve rapid fluctuations in image position without introducing tracking errors by averaging out these positional discrepancies in a way which may prove to be incorrect in view of unpredictable changes in the missile's flight pattern. Still further, considerable time is usually required to train personnel in becoming proficient trackers and to instruct them in distinguishing between objects to be tracked and indications on the monitor screen produced by atmospheric conditions or by other objects in the target's vicinity.

The above difficulties have been recognized, and attempts have been made to overcome them by providing individual azimuthal and elevational controls for orienting the tracking device, these controls being designed for operation independently of one another. Consequently, the operator has been required to use both of his hands for the tracking operation, making it impossible for attention to be directed to the actuation of other controls such as those which serve to focus the image or determine its brightness and contrast, or to regulate a device for recording it on some permanent storage medium for subsequent inspection and/or evaluation.

In accordance with one embodiment of the present invention, an image of an object to be tracked is caused to appear on the screen of a cathode-ray tube, this screen being positioned to lie substantially in a horizontal plane. A transparent pointer is associated therewith in such a manner that it can be manually actuated over the screen surface. This pointer is mechanically attached to a pair of potentiometers one of which is responsive to actuation of the pointer in a given direction of movement within the horizontal plane, and the other of which is responsive to actuation in a direction perpendicular thereto. Consequently, these two potentiometers can be arranged to yield voltages respectively indicative of the azimuthal and elevational characteristics of a target represented by the image developed on the tube's screen. Such voltages can then be respectively applied through a servo system to a pair of servo motors which control the orientation of the tracking camera. Through this mode of operation, any unskilled person is enabled to follow the movement of a synthesized image on a cathode-ray tube screen by using only two fingers of one hand, leaving the other hand free to regulate or adjust controls which form part of the auxiliary equipment.

In accordance with another embodiment of the invention, the necessity for physically moving the television camera itself is dispensed with by making the camera stationary and instead arranging for the selective rotation in two mutually perpendicular directions of an optical system positioned to intercept light from a tracked target and direct this intercepted light to the camera's photosensitive electrode. In this embodiment, movement of the camera itself is eliminated, and changes in the orientation of the tracking apparatus can be effected much more rapidly then when the relatively large mass of the camera itself must undergo rapid positional variations.

The present concept embodies as a still further feature means whereby not only the position of a target may be accurately determined but also its velocity. Expressed differently, a system constructed in accordance with the present concept inherently acts as a velocity-measuring apparatus so that, as long as the target's velocity remains unchanged, no action is required on the part of the operator to maintain the target properly centered on the fluorescent screen of the tracking unit. Also employed a so-called tracking-error-compensation network in which the image is caused to appear on a monitor tube at the same time that it appears on the screen of the tracking unity. Any positional displacement of the target image on the tracking unit may be compensated for by movement of the pointer so that it is superimposed upon the image. Through a raster-shifting network associated only with the tube of the tracking unit, such a movement of the pointer results in a flow of direct current through the deflecting means associated with the tracking tube, this flow of unilateral current being such as to move the raster in a direction opposite to that in which the pointer is actuated. The result is a cancellation or neutralization of the tracking error with respect to camera or optical system orientation although the image on the tracking unit remains in the off-center position which it occupied prior to pointer movement. However, insofar as the monitor tube is concerned, the effect of this current flow is such as to reposition the synthesized image in the center of the tube screen by changing the path of light reaching the camera tube through the optical system associated therewith. Thus, by causing the pointer to follow a target image, an operator automatically compensates for tracking error insofar as the monitor tube is concerned, even though it results in the pointer of the tracking tube remaining in a location which is off-set from its predetermined neutral position.

One object of the present invention, therefore, is to provide an improved electro-optical tracking system.

Another object of the invention is to provide an electro-optical tracking system employing a television camera designed to pick up light from a moving target and synthesize an image of such target on a screen of a cathode-ray tube.

A still further object of the invention is to provide an electro-optical tracking system in which an image is developed on the screen of a reproducing device, and further means incorporated therein whereby an operator can track positional variations in this image by superimposing thereon a pointer designed for manual actuation by the tracking operator in two mutually perpendicular directions within a horizontal plane.

An additional object is to provide an electro-optical tracking system which incorporates means through which tracking errors may be compensated for by developing a raster-shifting potential and utilizing such potential to control the position of a synthesized image on the screen of a tracking tube such that superimposition of a manually-actuatable pointer on such image will result in the centering of an image of the same target appearing on the screen of a monitor tube.

Other objects and many of the attendant advantages of this invention will be readily appreciated as the same become better understood by reference to the following detailed description when considered in connection with the accompanying drawings wherein:

FIG. 3 is a schematic diagram of a tracking-error-compensation network designed for use with the system of FIG. 2;

FIGS. 4 and 5 are representations of the respective fluorescent screens of the two cathode-ray tracking tubes of FIG. 2, showing various positional relationships between a target image and the transparent pointer used in carrying out the present invention;

FIGS. 6 and 7 are representations of the screen of the tracking tube shown in FIG. 3 before and after movement of the pointer associated therewith; and FIGS. 8 and 9 are representations of the screen of the monitor tube of FIG. 3 at times corresponding to those at which the images of FIGS. 6 and 7 are developed.

Figure 1:
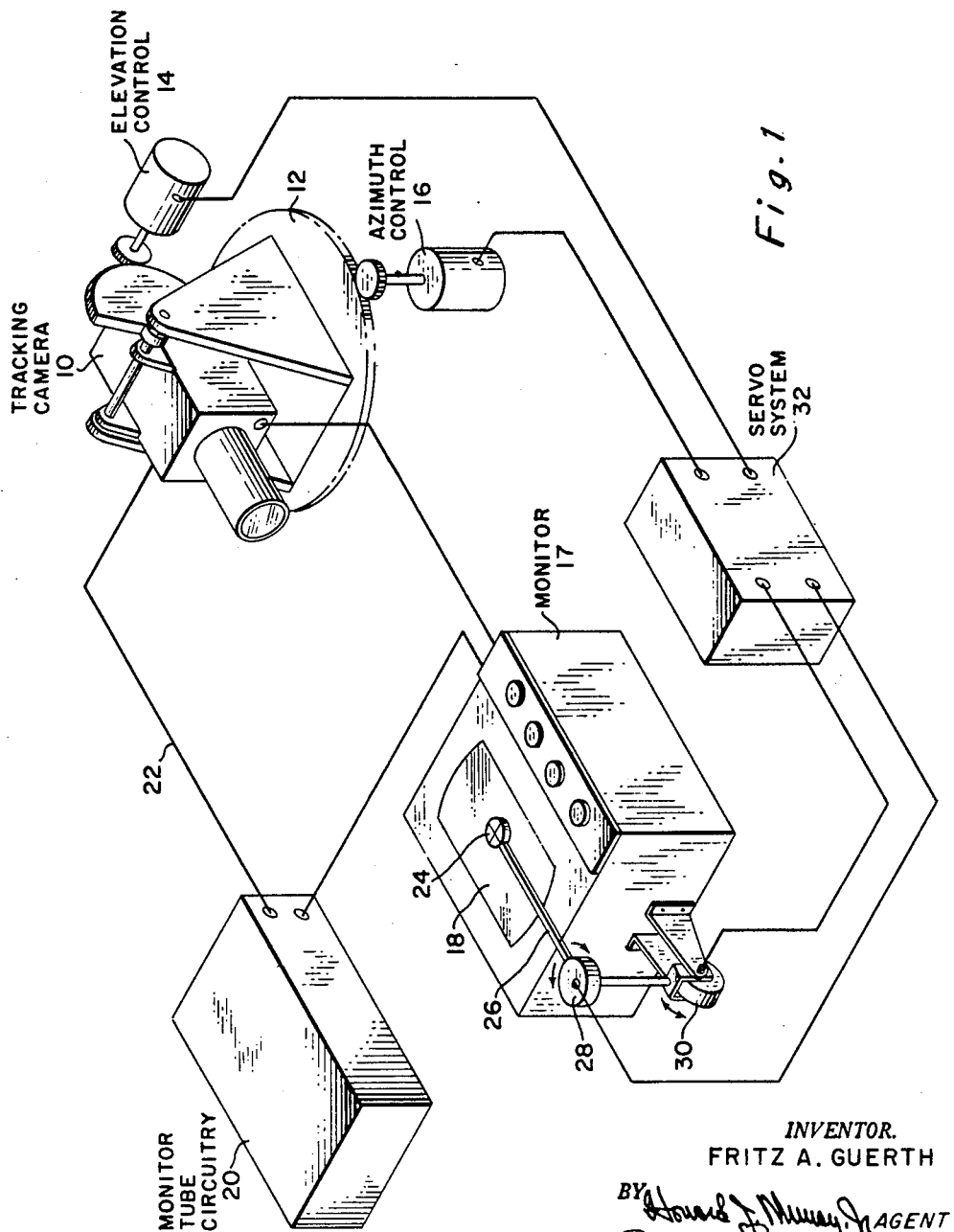
FIG. 1 is a schematic diagram of an electro-optical tracking system designed in accordance with one embodiment of the present invention.

Referring now to FIG. 1 of the drawings, there is shown an electro-optical tracking system which includes a television camera identified by the reference numeral 10. Camera 10 may be of a more or less conventional type, and is mounted upon a rotatable base 12. The mounting of camera 10 is such that it is pivoted for movement about a horizontal axis upon energization of a servo motor 14 acting through the gear assembly 15, the motor 14 thus acting as an elevational control for the camera. In similar fashion, the base 12 is rotatable about a vertical axis upon energization of a further servo motor 16 so that the latter serves as the camera's azimuthal control means.

The video output of the television camera 10 is applied to a monitor unit 17 which incorporates a cathode-ray tube 18. Tube 18 has associated therewith the usual deflection means and accelerating potential sources which form part of a standard driving circuit 20 the details of which are conventional and hence not illustrated in the drawing. A synchronizing connection 22 between the driving unit 20 and camera 10 results in the cathode-ray tube of the latter being synchronized in its operation with the monitor tube 18. This cathode-ray pickup tube of camera 10 is intended to intercept light from some moving object to be tracked. This object, for example, may be a missile, a rocket or a manned aircraft. The monitor tube 18 is intended to display thereon a synthesized image of the target picked up by the camera 10.

Associated with the monitor tube 18 is a pointer 24 which may comprise a transparent disc having a pair of cross hairs etched thereon. The disc 24 is attached to an arm 26 which leads to one of a pair of potentiometers 28 and 30. As shown in FIG. 1, these potentiometers 28 and 30 are so arranged as to develop voltages respectively indicative of the position of the pointer 24 in each of two mutually perpendicular directions within the same horizontal plane as that of the screen of the monitor tube 18. Expressed differently, the pointer 24 is designed for manual actuation within a rectangular coordinate system lying in a horizontal plane, this plane being generally defined by the screen of the monitor tube 18. In practical applications, the screen of tube 18 is oriented so as to be substantially horizontal, permitting the pointer element 24 to be moved thereacross by one hand of a tracking operator.

It will be apparent from the drawing that any movement of pointer 24 from the top to the bottom of screen 18 will change the position of the wiper element of potentiometer 28, while both the electrical and mechanical status of potentiometer 30 remains essentially unchanged. In a similar manner, a lateral or sidewise movement of pointer 24 will vary the position of the wiper element of potentiometer element 30 without causing any appreciable change in the electrical output of potentiometer 28. The result of such an arrangement is that two voltages are respectively derived from potentiometers 28 and 30 which are representative of the "vertical" and "horizontal" positions (in television terminology) of the pointer element 24. These voltages are applied through a servo system 32 to respectively control the operation of the elevational servo motor 14 and the azimuthal servo motor 16. Thus any movement of pointer 24 to vary the voltage output of either or both potentimeters 28 and 30 will result in a reorientation of the television camera 10.

It will now be appreciated that the two potentiometers 28 and 30 resectively possess voltage outputs which are dependent upon the displacement of the pointer 24 from a zero position, which, in the system being described, is assumed to be at the center of the screen of the monitor tube 18. These voltage outputs from potentiometers 28 and 30 can be of positive or negative polarity depending upon whether the displacement of pointer 24 from zero position is to the top or bottom of the screen in a "vertical" direction, or to the left or right in a "horizontal" direction. In the following description it will be shown that when the operator places the pointer 24 so that it is superimposed upon the synthesized image developed by tube 18, the camera 10 is correctly directed to properly track the desired target. When the operator places the pointer 24 so that it is superimposed upon the target image, and then follows the movement of this image with the pointer, movement of the image will stop when the angular velocity of the target has been reached. In other words, the amount of deflection of the pointer from its center or zero position on the screen is representative of the target's angular velocity. Consequently, therefore, movement of the television camera 10 lags target movement by the amount of pointer displacement. To compensate for this lag, the operator shifts the pointer to cause the synthesized image and the pointer to positionally coincide. This means that the television camera has achieved a rate of movement which results in the desired target being ideally tracked.

It will be noted that when targets are tracked which move for relatively long periods of time in a single direction, the zero reference point may be shifted from the center of the tube's screen toward one edge thereof by biasing the cathode-ray tube deflection circuitry. This has the effect of expanding the useful control area and at the same time increases the amount of voltage feedback to result in smoother and more accurate tracking. If desired, the edges of the fluorescent screen of tube 18 may be scaled to permit a visual determination of the magnitude of certain data concerning the object being tracked. Such data may be in the form of time, velocity or positional information (or any other matter which can be set forth in digital form) depicted on a scale appearing along one or more edges of the monitor tube.

The operation of a system such as shown in FIG. 1 may be briefly summarized by stating that movement of the pointer 24 across the screen of monitor tube 18 (so that the cross hairs on the pointer are superimposed upon the reproduced image of a desired target) translates the target's position into azimuthal and elevational information which is represented by the respective voltages developed by potentiometers 30 and 28. These voltages are developed as a function of the displacement of pointer 24 from its center or neutral position, such voltages being fed into a servo system which develops a driving force for the television camera. By superimposing the pointer cross hairs on the target image and following the movement of the image, movement stops when the angular velocity of the target is reached. Consequently, the amount of displacement of the pointer from neutral or zero position on the screen is indicative of the target's angular velocity. In effect, pointer movement compensates for any displacement between the axis of the camera lens and the target line-of-sight by bringing about a reorientation of the camera.

While the system above described operates in a satisfactory manner for targets moving with average or relatively low velocities, it is subject to certain limitations when the target's velocity exceeds a certain figure. This is due to the relatively high inertia possessed by the television camera and its associated mounting structure. It will be appreciated that sudden changes in target position cannot immediately be tracked by the camera due to the latter's relatively large mass. To provide for high-speed tracking of a moving object without introducing an objectionable time delay into the tracking operation, it has been found advantageous to maintain the tracking camera (or cameras) in a fixed position, and then employ an optical system which intercepts light from the target and supplies this intercepted light to the camera lens. To achieve such an objective, the optical system must be provided with means for causing it to follow target movement in the same fashion that the television camera 10 was oriented in the system of FIG. 1. A preferred form of such an optical arrangement is set forth in FIG. 2 of the drawings.

Figure 2:
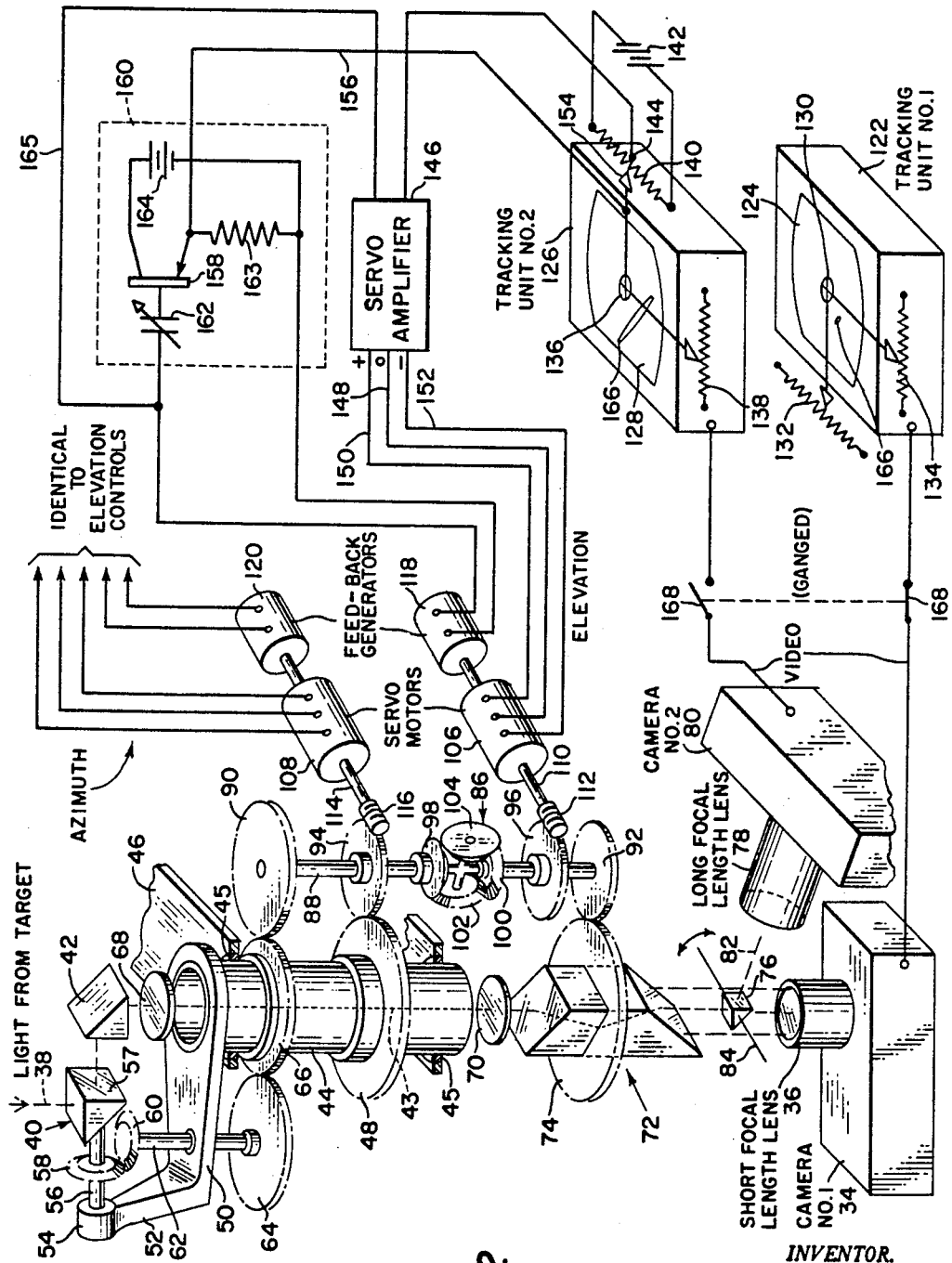
FIG. 2 is a partially schematic diagram of an electro-optical tracking system designed in accordance with another embodiment of the present invention.

Referring now to FIG. 2, there is shown a television camera 34 which may be identical to that of the camera 10 described in connection with the system of FIG. 1. For reasons which will later become apparent the camera 34 is provided with a lens 36 of relatively short focal length. The axis of lens 36 is parallel to an optical path 38 followed by light which is received from the moving object to be tracked and which impinges on one plane surface of a movable prism 40. This prism causes the light thus intercepted to be diverted at right angles to its original path, this light being again diverted at right angles by a further prism 42 so that it emerges along a path 43 which lies in parallel relationship to the previously-mentioned path 38.

As shown in FIG. 2, the optical path 43 is such that it also represents the longitudinal axis of a driving system which includes a hollow tubular shaft 44. This shaft 44 is mounted preferably by means of bearings 45 on a pair of rigid supports 46 so as to rotate freely with respect thereto. For the sake of clarity, the axis of this mechanically-driven system will be described as extending vertically, although it will be recognized that the terms "horizontal" and "vertical" are used for explanatory purposes only.

Rigidly secured to an intermediate point on shaft 44 is a gear 48, while at the upper end of shaft 44 is mounted an arm 50 having an extension 52 carrying a bearing 54 thereon. Journalled within bearing 54 is a shaft 56 secured to a diagonal face of prism 40 so that, upon rotation of shaft 56, prism 40 will undergo such movement as to maintain the emergent face 57 thereof in a vertical plane. Rotation of shaft 56 is brought about by means which includes a gear 58 rigidly attached to shaft 56, this gear 58 engaging a further gear 60 carried by a shaft 62 which passes in a vertical direction through an opening in the arm 50. The lower extremity of shaft 62 has mounted thereon a still further gear 64 designed to mesh with a threaded collar 66 arranged to rotate freely about the vertically-positioned shaft 44.

The prism 42 is supported by conventional means (not shown) from the arm 50 so that it rotates as a unit therewith. Thus, the face 57 of prism 40 from which light emerges is always maintained in parallel relationship with the face of prism 42 upon which this light is incident. Suitable lenses 68 and 70 are included to insure that light rays passing through a portion of the optical system are maintained in essentially parallel relationship.

Supported in the light path 43 is a triple-mirror unit (or a prism of the known "dove" type) generally identified as 72, the purpose of which is to double the angular displacement of light passing therethrough when the mirror system is rotated about its optical axis 43. Expressed differently, the angle of rotation of any point on an image off-set from the optical axis 43 is double with respect to the position of a corresponding point on an image received by the mirror system. Inasmuch as such units are known in the optical art, a further description of the structure thereof is not believed to be necessary.

Rotation of the mirror system 72 in a horizontal plane is brought about by means of a gear 74 attached circumferentially thereto. A portion of the light output from the triple-mirror unit 72 is picked up by the lens 36 of the television camera 34. The remaining portion of the light output of the triple-mirror system 72 is intercepted by a prism or angular mirror 76 which acts to divert the light so intercepted to the lens 78 of a further camera 80. The path 82 of the light thus diverted by the prism 76 lies substantially at right angles to the optical path 43 but is subject to slight variations therefrom when the prism 76 is rotated about an axis 84 by means which will be set forth in connection with a description of FIG. 3 of the drawings. For purposes of the present description, the two light paths 43 and 82 may be assumed to be essentially normal to one another.

To produce the required motion of the components of the electro-optical system of FIG. 2, a driving mechanism is illustrated which includes a differential gear assembly generally identified as 86. This unit 86 is carried on a vertical shaft 88 the axis of which is essentially parallel to the axis 43 of the tubular shaft 44. Shaft 88 carries on the upper end thereof a gear 90 which lies in a horizontal plane and is designed to transmit force from shaft 88 to the gear 64 through the freely-rotatable collar 66. A gear ratio of unity is chosen for the components 64, 66 and 90 so that shaft 62 rotates at essentially the same speed as that of shaft 88. As previously brought out, rotation of shaft 62 correspondingly rotates shaft 56 in a mutually perpendicular direction, thus bringing about a movement of the prism 40 in an essentially vertical plane such that a moving target may be tracked in one coordinate direction by rotation of shaft 88.

Mounted on the opposite end of shaft 88 from that of gear 90 is a further gear 92 designed to mesh with the gear 74 in order to bring about rotation of the triple-mirror system 72 about the optical axis 43. The ratio between gears 74 and 92, respectively, is established at 2:1 in order to compensate for the double speed of rotation of corresponding image points brought about by the triple-mirror system 72 described above.

Inasmuch as the collar 66 is freely mounted on shaft 44, rotation of gear 90 has no effect upon shaft 44; therefore, to develop such a force in order to move both the arm 50 and the prism 42 in a horizontal plane, a driving mechanism is utilized which includes a pair of gears 94 and 96 each of which is of the compound type incorporating a second set of integrally-formed longitudinally-spaced teeth 98 and 100 respectively. These teeth 98 and 100 form part of the differential gearing 86, the latter also including a further pair of oppositely-disposed parallel gears 102 and 104 respectively carried by arms extending as illustrated at right angles to the shaft 88 and forming an integral part thereof. The compound gear 94—98 is designed to rotate freely about shaft 88, and in a similar fashion the compound gear 96—100 is also mounted for free rotation about shaft 88; the horizontally-positioned gears 98 and 100 mesh in conventional differential fashion with the two vertically-positioned gears 102 and 104, so that, when energy is applied to either or both of the gears 94, 96, a differential motion is imparted through the gearing assembly 86 to the shaft 88 which, as above stated, drives both the gears 64 and 74 of the optical assembly.

The gear 94 is designed to mesh directly with the gear 48 securely attached to the hollow tubular shaft 44. The ratio between these two elements is chosen to be 2:0 in order to bring about a proper rotational velocity of the triple-mirror unit 72.

To provide both elevational and azimuthal control for the optical system which includes the prisms 40, 42 and the triple-mirror unit 72, there is provided a pair of servo motors 106 and 108 respectively. The servo motor 106 drives a shaft 110 upon which is mounted a worm gear 112 which meshes with the pinion gear 96. In similar fashion, the servo motor 108 drives a shaft 114 upon which is mounted a worm gear 116. The latter, as illustrated, meshes with the pinion gear 94.

Also associated with the shaft 110 is a feedback generator 118 which acts to develop a voltage, as a function of rotation of shaft 110, for a purpose to be later described. Shaft 114 has associated therewith a similar feedback generator 120.

Electrical connections to the motor 108 and to the feedback generator 120 are utilized to provide for azimuthal positioning of the optical system. However, the means for bringing about this azimuthal control may be identical in all respects to that employed for developing elevational control through the members 106 and 118, and hence a duplicate showing of the azimuthal controls has been omitted from the drawing for the sake of simplicity. The elevational controls include a number of components which will now be described.

Light from a tracked target passes through the optical system of FIG. 2, and a portion of this light is picked up by the camera 34, which, as above mentioned, includes a lens 36 of relatively short focal length. The remaining portion of this intercepted light is diverted by means of prism 76 and is picked up by the remaining camera 80, which incorporates the lens 78 of relatively longer focal length. The video output of camera 34 (hereinafter referred to for simplicity as camera No. 1) is applied to a tracking unit 122 which includes a cathode-ray tube having a screen 124 so positioned as to lie essentially in a horizontal plane. In similar fashion, the video output of camera 80 (hereinafter designated as camera No. 2) is applied to a second tracking unit 126 also having a cathode-ray tube screen 128 as a principal component thereof, the face of tube 128 likewise lying essentially in a horizontal plane. Normal deflecting components (not shown) of units 122 and 126 cause a representation of the target tracked by the optical system to appear on the screens 124 and 128, respectively, in accordance with the characteristics of the light intercepted thereby.

It will be recalled that the description of the system of FIG. 1 the monitor tube 18 was provided with a movable pointer 24 connected to a pair of potentiometers 28 and 30 the position of which was dependent upon the location of pointer 24 with respect to some predetermined location on the monitor tube screen. Any "vertical" displacement of pointer 24 from this central or neutral position resulted in a variation in the output of potentiometer 28, while in similar manner any "horizontal" displacement of the pointer changed the electrical output of potentiometer 30. Expressed differently, the respective outputs of these two potentiometers were representative of the elevational and azimuthal characteristics of the tracked target.

The tracking units 122 and 126 of FIG. 2 each operate in a manner similar to that of the monitor of FIG. 1. In other words, a pointer 130 is movable in any direction over the screen 124 of the cathode-ray monitor tube, such movement causing voltage variations in the respective outputs of a pair of potentiometers 132 and 134. These potentiometers 132 and 134 of FIG. 2 have been illustrated schematically to avoid an unnecessary complication of the drawing, but it will be understood that they may be structurally similar and interconnected in a manner identical to the potentiometers 28 and 30 of FIG. 1. In similar fashion, tracking unit 126 incorporates a movable pointer 136 connected to two potentiometers 138 and 140.

In as much as the output circuitry of tracking unit No. 1 is generally identical to that of tracking unit No. 2, it is believed that a detailed description of the latter will suffice for an understanding of the operation of applicant's system. Consequently, it need only be stated that potentiometer 140 has connected thereacross a source of potential 142, and that from a center tap 144 on potentiometer 140 a connection is made to a servo amplifier 146. This servo amplifier 146 may be of more or less conventional design, and hence has been illustrated in the drawing merely as having three electrical output connections 148, 150 and 152 to the servo motor 106. It will be recognized by those skilled in the art that the speed and direction of rotation of servo motor 106 is a function of the electrical potentials respectively applied thereto over conductors 148, 150 and 152, and that such motor operation is essentially linear in the sense that it is a direct function of the amplitude and polarity of such applied voltages. However, since this is well known in the servo motor art, no further description thereof is believed necessary.

The position of the movable contact 154 of potentiometer 140 is, of course, determined by the location of pointer 136, and consequently a voltage representative of this position is applied over conductor 156 to the emitter electrode of a transistor 158. This transistor 158 forms part of an amplifier circuit 160 which acts as an impedance-changing network.

The feedback generator 118 is designed to generate a D.-C. potential representative of the speed of rotation of shaft 110. Consequently, variations in the speed of servo motor 106 cause corresponding changes in the D.-C. output of generator 118. As shown in FIG. 2, the generator 118 is connected in series with a variable capacitor 162, the transistor 158, and a fixed resistor 163. A source of potential 164 is connected between the collector electrode of transistor 158 and the generator-connected terminal of resistor 163. Consequently, when the servo motor 106 rotates, the feedback generator 118 develops a potential on capacitor 162 of a value dependent upon motor speed. As long as this potential developed on capacitor 162 by the feedback generator 118 is essentially identical to the output of potentiometer 140 as determined by the position of movable contact 144, the speed of servo motor 106 remains constant. This is because the amplifier circuit 160 in effect compares these two potentials and supplies to servo amplifier 146 over conductor 165 and error voltage representing the difference between the two quantities. It will now be seen that movement of potentiometer contact 154 in either direction away from center tap 144 increases the potential applied over conductor 156 and hence causes an unbalance between such voltage and the output of the feedback generator 118. This voltage difference is sensed by the network 160, in such a manner as to increase the potential developed on capacitor 162. This has the effect of increasing the output of the servo amplifier 146 to thereby increase the speed of rotation of servo motor 106.

In summary, therefore, it will be seen that by placing the pointer 136 on the target image a voltage is produced between the movable contact 154 of the potentiometer 140 and the center tap 144 thereon, thus starting the servo motor 106. The coupled feedback generator 118 now develops a potential proportional to the servo motor velocity, and this potential opposes the potentiometer voltage. The generator output is transferred into the servo loop by the amplifier network 160. This "transfer" action is delayed by the variable capacitor 162 for a time interval determined by the capabilities of the tracking operator. The voltage, thus transferred into the servo loop increases the velocity of the camera (or optical system) to bring the moving target again to the center of the screen. The pointer following the target causes the velocity of the tracking system to again be reduced to a very small value dependent upon the overall gain of the servo amplifier 146.

It will now be appreciated that any displacement of pointer 136 in a "vertical" direction from neutral or central position indicates the necessity for varying the velocity of movement of the tracking apparatus with respect to its elevation component. (It is assumed, as above mentioned, that a similar circuit is utilized for the potentiometer 138 and the azimuthal control elements 108 and 120.)

It has been stated that camera 34 is provided with a lens 36 of relatively short focal length, and that the camera 80 is provided with one (78) of relatively long focal length. Consequently, a target image 166 appearing on the cathode-ray tube screen 124 of the tracking unit 122 will have overall dimensions determined by the characteristics of the lens 36 and of the overall optical system. Occasionally this image is so small in size that accurate superimposing of the pointer 130 thereon by an operator becomes difficult and cannot be carried out with a high degree of accuracy. To facilitate the tracking operation, the optical characteristics of the lens 78 of camera 80 are such that a corresponding target image 166 appears on the screen 128 of the cathode-ray tube forming part of the tracking unit 126, but this image on the screen 128 is considerably enlarged in its overall dimensions due to the telephoto effect of lens 78. In FIG. 4, for example, a representative target image, identified by the same reference numeral 166, is presented to an operator of tracking unit No. 1. In addition, this target image appears in enlarged form on the screen 128 of target unit No. 2 as illustrated in FIG. 5. It is apparent that the presence of such an enlarged representation greatly increases the ease with which the pointer 136 may be manipulated to center such pointer over the reproduced image and thereby assure that the described system is effectively tracking the target.

In actual practice, tracking units #1 and 2 are employed in an alternative sense, this mode of operation being made possible by the presence of a pair of ganged switches 168 respectively included in the video connection between the two pickup cameras and their respective tracking units. It has been found that optimum operation can be achieved by permitting the operator of tracking unit No. 1 to bring his pointer 130 into the general region of the target image 166, and then to operate the two ganged switches 168 so that an enlarged image of the target is presented on the screen of tracking unit No. 2. The operator of this latter unit can then readily superimpose his pointer 136 upon the enlarged image in a more accurate manner than could the operator of tracking unit No. 1. In the event that tracking operator No. 2 loses the image on his screen by virtue of a change in speed of the target or for some other reason, control can be switched back to unit No. 1, whereupon the above-described procedure is repeated. It should be emphasized, however, that although two separate tracking units 122 and 126 have been illustrated and described as constituting a preferred embodiment of the present concept, either one of these two units may be omitted and tracking carried out by the single remaining assembly.

In a description of the arrangement of FIG. 2 it has been stated that a prism 76 is mounted in the optical path of light emerging from the unit 72, the purpose of prism 76 being to divert a portion of this light to the lens 78 of camera 80. It has also been brought out that this prism 76 rotates about an axis 84 lying normal to the optical path of light to the camera lens 36. In FIG. 3 of the drawings, the prism 76 of FIG. 2 is illustrated in the form of a planar reflective surface lying at an angle of essentially 45° to the principal optical path 43. In effect, therefore, the reflective surface shown in FIG. 3 performs the function of the surface of prism 76 in FIG. 2 from which light is directed to the lens 78 of camera No. 2. To simplify the following description, this reflective member of FIG. 3 has been designated by the same reference numeral 76 as that employed to identify the corresponding prism in FIG. 2. Likewise, the direction of rotation of the reflective element in FIG. 3 is about an axis normal to the plane of the drawing, the reference numeral 84 of FIG. 2 being likewise retained for this axis.

For the purpose of describing the features of applicant's tracking system covered by FIG. 3, it is only necessary to consider that portion of the intercepted light which is diverted by the reflective surface 76 to the lens 78 of camera 80. This light is directed to follow a path which normally lies at an angle of 90° to light passing along the principal axis 43 of the optical system shown in FIG. 2. However, rotation of the surface 76 about axis 84 will cause a displacement of this light path to either side of its normal position, as schematically depicted by the broken lines in FIG. 3. Such rotation of the surface 76 may be brought about by means of a more or less conventional solenoid arrangement 170 which is energized by a D.-C. potential caused to flow through the deflecting coils 172 of the cathode-ray tube forming part of the tracking unit 126 of FIG. 2.

Before completing a description of the system of FIG. 3, it might be mentioned that it is occasionally desirable to present a visual representation of the tracked target on the screen of a monitor tube, so that the course of the moving object may be observed by individuals who are not directly engaged in operating either of the tracking units 122 and 126 of FIG. 2. Such a monitor tube is schematically shown in FIG. 3 and generally identified by the reference numeral 174. The video output of camera 80 is applied directly to this monitor tube 174 and to a recorder where it is impressed upon some medium such as a magnetic tape which is connected in parallel with the cathode-ray tube in the tracking unit 126. Consequently, identical presentations occur on both the screen 175 of the monitor tube 174 and on the screen 128 of the display tube of tracking unit No. 2.

It has been brought out that it is necessary for an operator of the energized tracking unit (such as #2, for example) to maintain the transparent pointer 136 superimposed upon the target representation 166 in order that the disclosed system effectively track a desired target. When the target image 166 as displayed on the screen 128 moves to a position where it is no longer centered on this screen, then it becomes essential for the tracking operator to move pointer 136 to a position where it coincides with the new position of the target image. However, such a movement of pointer 136 should be so correlated with the operation of the optical system of FIG. 2 that the result of the movement is to center the target upon the screen 175 of monitor tube 174. This can only be accomplished by providing for a different movement of the target on the monitor tube screen from that which appears on the tracking tube screen. It is obvious that if a target image developed on the tube of the tracking unit were to be displaced as a function of pointer movement, then it would be impossible from a practical standpoint to bring about a superimposition of the pointer upon the target, inasmuch as the latter would not remain stationary during pointer movement. To overcome this condition, the circuit of FIG. 3 is so designed that movement of the pointer 136 causes an output voltage to be developed in conductor 176, the amplitude of which is directly proportional to the amount of displacement of the movable contact 154 of potentiometer 140 from its normal position where it coincides with the tap 144. As above stated, this normal position of potentiometer contact 154 represents a position of transparent pointer 136 where it is centered with respect to the screen 128 of the cathode-ray tube.

In describing the operation of circuit of FIG. 3, it will first be assumed that the target image 166 has become displaced laterally to the left as shown in FIG. 6. It now becomes incumbent upon the operator of the tracking unit 126 to move the pointer 136 to the left so that it overlies the new position of the target image. The pointer is therefore moved from the position shown in dotted lines in FIG. 7 to that shown in solid lines, where it is aligned with the target. However, such a movement of the pointer 136 results in an output from potentiometer 140 of a magnitude different from that which was present prior to pointer movement, and this potential is applied through an amplifier circuit 178 to the deflecting coils 172 of the cathode-ray tube forming a part of the tracking unit 126. The polarity of this developed potential is such as to oppose the voltage which would normally cause a shift in the position of the target image in a direction coinciding with pointer movement. In other words, movement of pointer 136 normally causes a corresponding movement of the optical system of FIG. 2, and this would normally cause the apparent position of the target to move in the same direction as the pointer so that the operator would be precluded from ever bringing about a desired coincidence therebetween. By developing this opposing error voltage in the conductor 176, however, the latter voltage becomes, in effect, a neutralizing voltage to cause the target image 166 appearing on screen 128 to remain in a fixed position during manual manipulation of pointer 136. Thus the operator of tracking unit No. 2 is enabled to control the tracking system of the present invention so that it accurately tracks the target merely by superimposing the pointer 136 upon the image of the target no matter whereupon screen 128 this target image may appear.

However, it is desired that this reproduced target image 180 appear at all times in the center of the screen 175 of monitor tube 174. Consequently, the neutralizing voltage developed in conductor 176 is not suitable for direct application to the monitor tube. In order that this error voltage output of circuit 178 (which is, as above stated, directly proportional to the displacement of the target image 180 from the center of the tracking tube screen) effect a centering action with respect to the monitor tube, this error voltage which causes a flow of current through the deflecting coils 172 is also caused to flow through the coil of the solenoid 170 which controls the angular position of the reflecting surface 76 about its axis of rotation 84. It will now be seen that variations in the error voltage developed in conductor 176 not only control the position of the target image developed on screen 128 of camera tube No. 2, but also determine the optical path followed by light reflected from surface 76 to the lens 78 of camera tube 80, as indicated in FIG. 3 by the broken lines. As a result, movement of pointer 136 to vary the voltage output of circuit 178 brings about a positional change in the reflecting surface 76 the effect of which is to alter the apparent position of the target as viewed by the lens 78. In turn, this changes the position of the image reproduced on monitor tube 174, this change being such as to maintain the location of the reproduced image 180 in the central portion of the tube screen, as shown in FIG. 9, the off-set position of the monitor tube image illustrated in FIG. 8 being exaggerated to bring out the extent of the compensating action which can be developed.

Although the video output of camera 80 is applied in parallel to both the monitor tube and the cathode-ray tube of the tracking unit, it will now be seen that the neutralizing or compensating voltage which effects a shift in raster position is applied only to the deflecting means of the tracking unit and not to the deflecting means of the monitor tube. Such an arrangement as shown in FIG. 3 enables the pointer 136 to be manaually manipulated by the operator without introducing positional variations in the tracking tube image.

Obviously many modifications and variations of the present invention are possible in the light of the above teachings. It is therefore to be understood that within the scope of the appended claims the invention may be practiced otherwise than as specifically described.

I claim:

1. In an electro-optical tracking system: a television camera capable of being oriented in both azimuth and elevation, a monitor tube, means for presenting on said monitor tube an image observed by said camera, said monitor tube including a fluorescent screen disposed generally in a horizontal plane, a pointer associated with said screen and movably supported thereupon for manual manipulation by an operator of said tracking system, electrical control means attached to said pointer and operating without regard to the emission of light from the fluorescent screen of said monitor tube for developing a pair of potentials respectively representative of the location of said pointer with respect to a predetermined reference position in a rectangular coordinate system within the plane of said monitor tube screen, a servo system to which the said pair of potentials are applied, a pair of servo motors for respectively orienting said camera in azimuth and elevation, and means for applying the output of said servo system to said pair of servo motors whereby said camera is oriented in accordance with the displacement of said pointer from its said reference position as represented by the magnitude of the potentials respectively developed by said electrical control means.

2. The combination of claim 1 in which electrical control means for developing said pair of potentials includes two potentiometers disposed in mutually perpendicular planes so as to respectively measure the displacement of said pointer from said reference position in each of the two coordinates of said rectangular system.

3. The combination of claim 1 in which said pointer is in the form of a disc overlying the said fluorescent screen and adapted for manual manipulation thereover by one hand of the tracking operator, said disc being of such a nature that the area of said screen located directly thereunder may be observed therethrough by said operator.

4. In an electro-optical system for following the course of a moving object: an optical system for intercepting light from such moving object, a device for converting such intercepted light into electrical energy, a pair of electro-mechanical driving means for respectively positioning said optical system in two mutually perpendicular directions, a cathode-ray image reproducing device, means for applying the output of said electro-optical converting means to the said reproducing device so as to develop on the latter an image representative of the object the course of which is being followed, an electrical network for developing a pair of control voltages for respective application to the said electro-mechanical driving means, and means associated with the said image-producing device for causing the said voltages developed by said network to be respectively representative of the location of the reproduced image on the screen of said device, such voltages acting to maintain the image so developed in a predetermined reference location on said screen regardless of any positional variations in the said optical system that would otherwise tend to displace such developed image from the said reference location.

5. In a system for following the course of a moving object which is subject to variations in both elevation and azimuth: means for intercepting light from such object and converting the light so intercepted into an electrical signal, an image-reproducing device having a fluorescent screen, means for applying said electrical signal to said reproducing device so as to result in the presentation on said screen of an image representative of the object the course of which is being followed, means for controlling the position of said light-intercepting means in two mutually perpendicular directions, manually-actuatable means associated with the said image-reproducing device and operating without regard to the emission of light from the fluorescent screen of such device for developing a pair of electrical potentials respectively indicative of the positional displacement of said image from a predetermined reference position on said screen, and a circuit for applying the potentials thus developed to determine the orientation of said light-intercepting means so that it is maintained in a position to intercept light from the said object regardless of variations in its azimuthal and elevational characteristics.

6. The combination of claim 5 in which the said manually-actuatable means associated with said image-reproducing device for developing the said pair of potentials includes an element designed for manual manipulation within an area defined by the screen of said reproducing device, the position of such element from a reference position with respect to said screen being indicative of both the direction and amount of misalignment of the said optical system from a position where it is directed to the object the course of which is being followed.

7. In an electro-optical tracking system: means for intercepting light from a moving object to be tracked, said light-intercepting means being controllable in both azimuth and elevation, a pair of servo motors for respectively controlling the position of said light-intercepting means with respect to azimuth and elevation, a voltage-generating circuit having two outputs respectively indicative of the departure of said light-intercepting means from alignment in azimuth and elevation with the moving object being tracked, a servo amplifier adapted to energize said pair of servo motors, a pair of feed-back generators respectively associated with said pair of servo motors, an amplifier receiving the output of one of said pair of feed-back generators, said amplifier including means for yielding a control potential in accordance with the magnitude and polarity of the output of said one feed-back generator as compared to one output of said voltage-generating circuit, the output of said amplifier being applied to said servo amplifier so as to result in one of said servo motors operating in a direction and with a speed determined in accordance with the departure of said light-intercepting means from its condition of alignment in azimuth or elevation with the object being tracked as represented by the said one output of said voltage-generating circuit.

8. In an electro-optical tracking system: means for intercepting light from a moving object and presenting this object as a synthesized image on the screen of a reproducing tube, said light-intercepting means being controllable in both elevation and azimuth; manually-actuatable means for developing a pair of potentials respectively indicative of the departure of the said synthesized image from a predetermined reference position on the said reproducing tube screen, said pair of potentials thus developed acting to realign the said light-intercepting means with the object being tracked when the said manually-controllable means is actuated to coincide in position with the said synthesized image; an error-compensation network to which one of the said pair of potentials is applied, said error-compensation network being effective to cause the synthesized image developed by said reproducing tube to change its position on the screen of said device as a function of and in a direction opposite to any displacement of the said manually-actuatable means the purpose of which displacement is to effect a coincidence therebetween, a further monitor tube also acting to present on the screen thereof a synthesized image of the object being tracked; and circuit means for causing a positional shift in the synthesized image produced on said monitor tube to a predetermined representative position upon a movement of the said manually-actuatable means associated with the said reproducing tube, whereby such a positional displacement of the said manually-actuatable means to result in coincidence with the synthesized image will not thus displace the image developed by the said monitor tube but instead will act to maintain the latter image in a desired location on the screen thereof.

9. The combination of claim 8 in which the said light-intercepting means possesses a principal optical axis, and includes means for diverting a portion of the light so intercepted from such axis, said last-mentioned means being adjustable through a limited angle and on an axis of rotation lying essentially perpendicular to the said principal axis of the light passing through said intercepting means, a camera tube for picking up the light so diverted and converting this diverted light into an electrical potential, a circuit for applying this electrical potential to both the said image-reproducing tube and the said monitor tube to result in the formation of a synthesized image, and a further circuit for applying the potential representative of a positional displacement of the said manually-actuatable means associated with the screen of the said reproducing tube to maintain constant the location of the image synthesized by such tube and also to cause a positional variation in the said light-diverting means thereby to vary the angle made by the light so diverted with respect to the principal optical axis of said light-intercepting means.

References Cited in the file of this patent

UNITED STATES PATENTS

| | | |
|---|---|---|
| 2,734,269 | Claret | Feb. 14, 1956 |
| 2,842,760 | McLucas | July 8, 1958 |
| 2,917,737 | Close | Dec. 15, 1959 |
| 2,938,949 | Vosburgh | May 31, 1960 |